United States Patent
Huang et al.

(10) Patent No.: US 10,886,689 B2
(45) Date of Patent: Jan. 5, 2021

(54) STRUCTURED LIGHT SENSING ASSEMBLY

(71) Applicant: TRIPLE WIN TECHNOLOGY(SHENZHEN) CO. LTD., Shenzhen (CN)

(72) Inventors: Chun-Yao Huang, New Taipei (TW); Cheng-An Lin, New Taipei (TW)

(73) Assignee: TRIPLE WIN TECHNOLOGY(SHENZHEN) CO. LTD., Shenzhen (CN)

(*) Notice: Subject to any disclaimer, the term of this patent is extended or adjusted under 35 U.S.C. 154(b) by 58 days.

(21) Appl. No.: 16/263,221

(22) Filed: Jan. 31, 2019

(65) Prior Publication Data

US 2020/0194954 A1  Jun. 18, 2020

(30) Foreign Application Priority Data

Dec. 15, 2018  (CN) .......................... 2018 1 1537587

(51) Int. Cl.
| | | |
|---|---|---|
| *H01S 3/00* | (2006.01) | |
| *G06T 7/50* | (2017.01) | |
| *G02B 27/09* | (2006.01) | |
| *G01B 11/16* | (2006.01) | |

(52) U.S. Cl.
CPC .......... *H01S 3/0085* (2013.01); *G01B 11/167* (2013.01); *G02B 27/0944* (2013.01); *G06T 7/50* (2017.01)

(58) Field of Classification Search
CPC .... H01S 3/0085; H01S 3/005; H01S 3/10023; G01B 11/167; G01B 11/2441; G11B 7/22; G11B 7/1381; G06T 7/50; G02B 27/0944; G02B 27/4261; H05G 2/003; H05G 2/008
See application file for complete search history.

(56) References Cited

U.S. PATENT DOCUMENTS

| | | | |
|---|---|---|---|
| 9,904,068 B1* | 2/2018 | Stinson | H05G 2/003 |
| 2005/0025027 A1* | 2/2005 | Sohn | G11B 7/123 |
| | | | 369/112.05 |
| 2009/0237672 A1* | 9/2009 | Doerband | G01B 9/02039 |
| | | | 356/457 |
| 2010/0182698 A1* | 7/2010 | Nemeth | G03H 1/0011 |
| | | | 359/576 |
| 2012/0250487 A1* | 10/2012 | Yoshinaga | G11B 7/22 |
| | | | 369/112.03 |
| 2014/0247492 A1* | 9/2014 | Ushigome | G02B 5/1866 |
| | | | 359/569 |
| 2015/0138346 A1* | 5/2015 | Venkataraman | G06T 7/596 |
| | | | 348/135 |
| 2015/0360500 A1* | 12/2015 | Lok | B42D 25/328 |
| | | | 349/194 |
| 2017/0299869 A1* | 10/2017 | Urey | G02B 27/48 |

FOREIGN PATENT DOCUMENTS

| | | |
|---|---|---|
| TW | M520147 U | 4/2016 |
| TW | 201630288 A | 8/2016 |
| TW | 201706674 A | 2/2017 |

* cited by examiner

*Primary Examiner* — Sang H Nguyen (74) *Attorney, Agent, or Firm* — ScienBiziP, P.C.

(57) ABSTRACT

A structured light emitting module includes a light source and a diffractive optical component. The light source generates laser light. The diffractive optical component is arranged on an optical path of the laser light emitted by the light source for diffracting the laser light. There is no lens arranged on an optical path of the laser light emitted by the light source.

10 Claims, 6 Drawing Sheets

STRUCTURED LIGHT SENSING ASSEMBLY

FIELD

The subject matter herein generally relates to a structured light sensing assembly and an electronic device implementing the structured light sensing assembly.

BACKGROUND

Structured light sensing technology generally utilizes a structured light emitting assembly to actively perform feature calibration on an object to be detected. After structured light is reflected from a surface of the object, a structured light receiving assembly receives the reflected structured light, and an image of the object is formed. Structured light sensing technology is widely used in 3D face recognition, gesture recognition, 3D scanners, and precision machining. However, the existing structured light emitting assemblies all include lenses. Generally, the lenses are made of materials with different refractive indexes, and a manufacturing process is complicated, thereby increasing manufacturing costs.

BRIEF DESCRIPTION OF THE DRAWINGS

Implementations of the present disclosure will now be described, by way of embodiments, with reference to the attached figures.

DETAILED DESCRIPTION

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other word that "substantially" modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series and the like.

Figure 1:
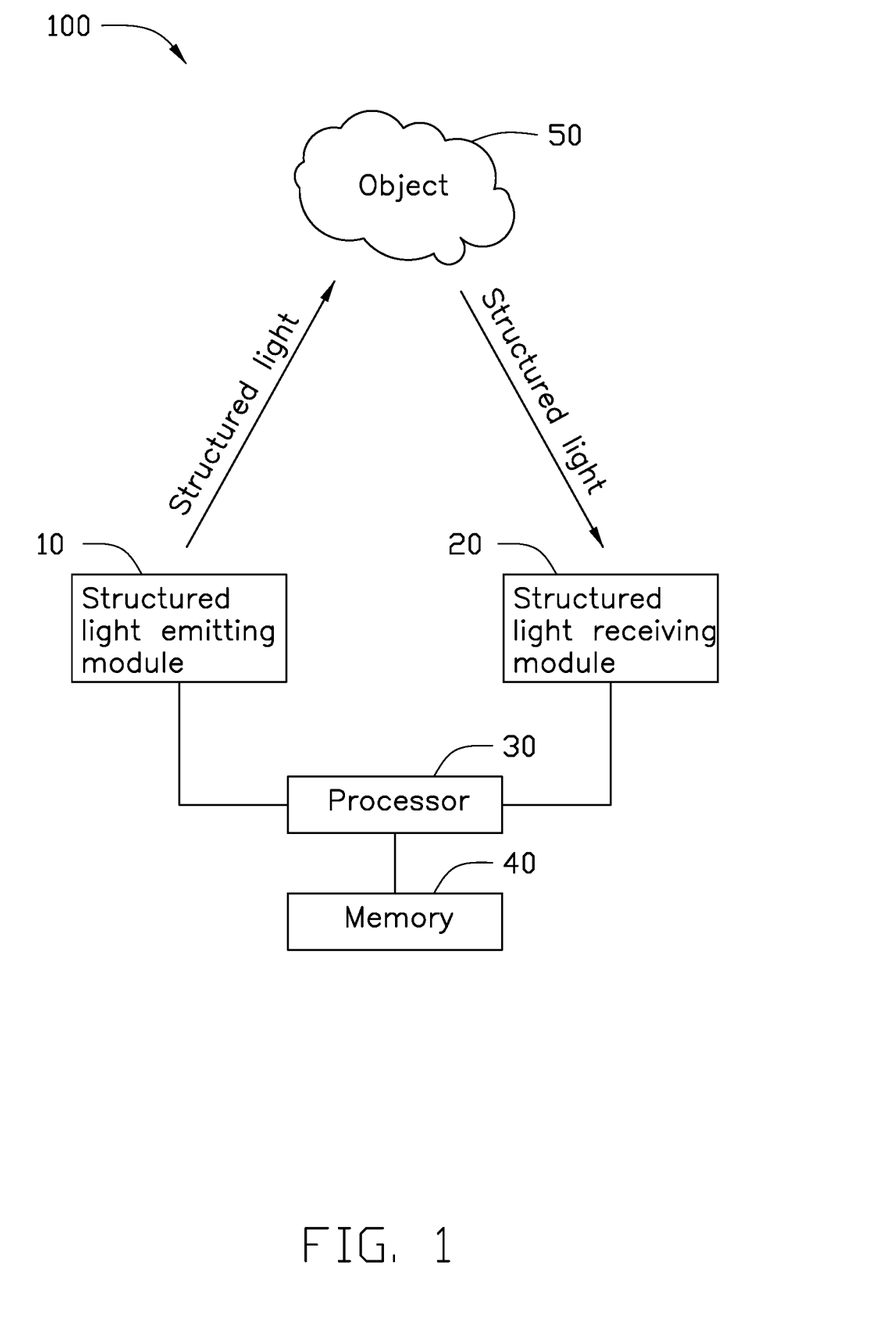
FIG. 1 is a block diagram of an embodiment of a structured light sensing assembly.

FIG. 1 shows an embodiment of a structured light sensing assembly 100 including a structured light emitting assembly 10, a structured light receiving assembly 20, a processor 30, and a memory 40. The processor 30 is electrically coupled to the structured light emitting assembly 10, the structured light receiving assembly 20, and the memory 40. The memory 40 stores parameter information of the structured light emitting assembly 10 and of the structured light receiving assembly 20. The parameter information may be distance information of the structured light emitting assembly 10 and the structured light receiving assembly 20.

As shown in FIG. 1, the structured light emitting assembly 10 can generate differently encoded structured light, project the structured light onto a surface of an object 50 to be detected, and perform feature calibration on the object 50 to be detected. The structured light is received by the structured light receiving assembly 20 after being reflected by the surface of the object 50 to be detected. The structured light emitted by the structured light emitting assembly 10 may carry a pattern of original positional information, and the pattern of original positional information changes after the structured light is reflected from the surface of the object 50 to be detected.

The processor 30 calculates the distance information of the structured light emitting assembly 10 and the structured light receiving assembly 20, focal length information of the structured light receiving assembly 20, and the original position information of the structured light projected by the structured light emitting assembly 10 according to the memory 40. The depth information of the object 50 to be detected is calculated according to a change in the original position information of the structured light received by the structured light receiving assembly 20. The structured light pattern is defined as a plurality of regions, and each region can correspondingly calculate depth information of a group of objects 50 to be detected, and the depth information of a plurality of groups of objects 50 to be detected are combined to form a stereoscopic image including the depth information of the object 50 to be detected.

Figure 2:
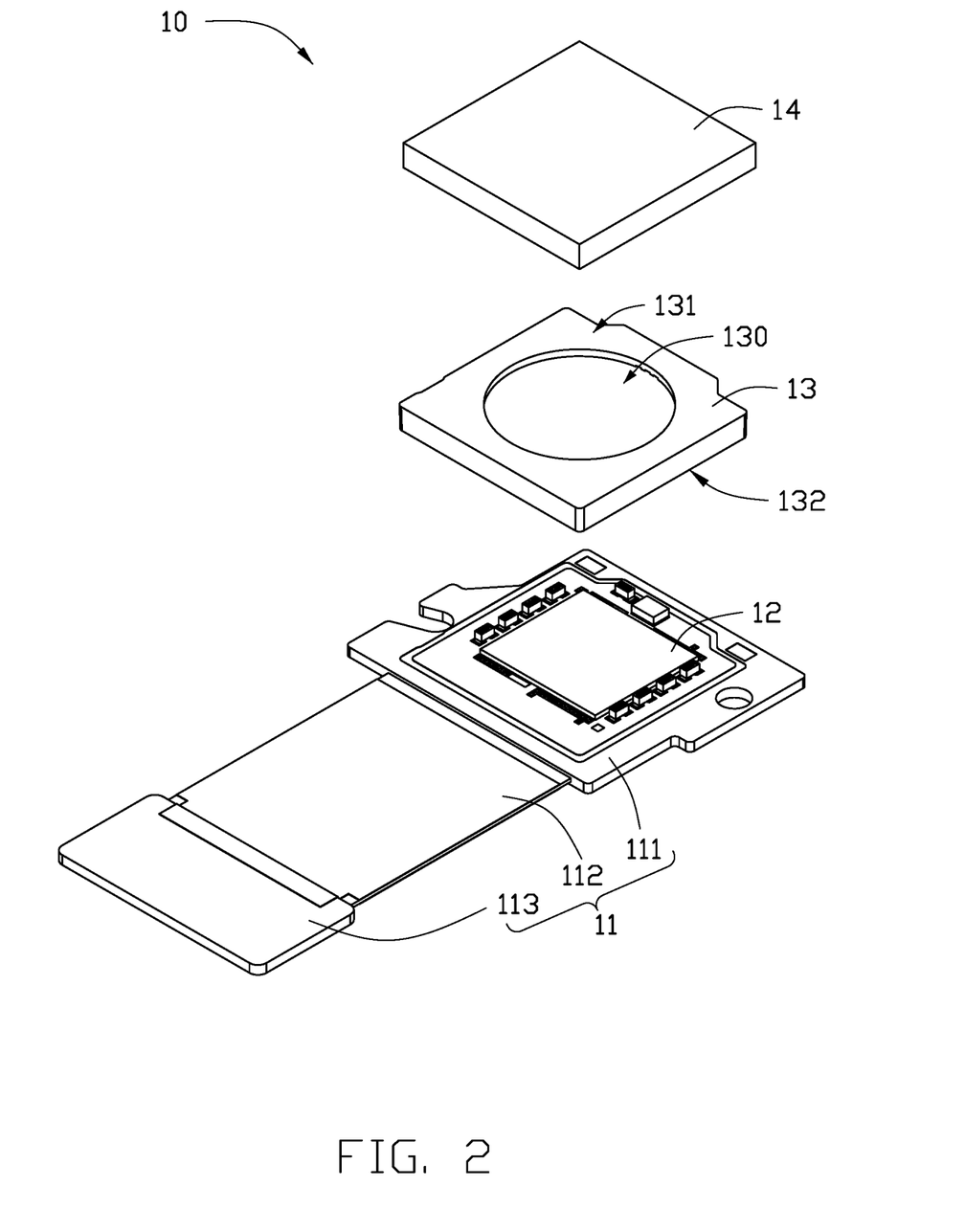
FIG. 2 is an exploded isometric view of a structured light emitting assembly of the structured light sensing assembly shown in FIG. 1, the structure light emitting assembly including a positioning bracket.

Referring to FIG. 2, the structured light emitting assembly 10 includes a controller 11, a light source 12 arranged on the controller 11 and electrically coupled to the controller 11, and a diffractive optical component 14 arranged on a side of the light source 12 away from the controller 11. The light source 12 generates laser light. The diffractive optical component 14 diffracts the laser light generated by the light source 12. A positioning bracket 13 is arranged between the diffractive optical assembly 14 and the controller 11 to fix a distance between the diffractive optical assembly 14 and the controller 11.

The controller 11 includes a printed circuit board 111, a flexible circuit board 112 electrically coupled to the printed circuit board 111, and a port 113 electrically coupled to the flexible circuit board 112. The port 113 is electrically coupled to the processor 30, so that the processor 30 can control the structured light information transmitted by the structured light emitting assembly 10 onto the surface of the object 50 to be detected. The controller 11 controls the light source 12 to switch on and off and a magnitude of operating power to produce differently encoded structured light.

As shown in FIG. 2, the positioning bracket 13 is substantially plate-shaped and includes a first surface 132 facing the light source 12, a second surface 131 facing the diffractive optical assembly 14, and a through hole 130 penetrating the first surface 132 and the second surface 131. The positioning bracket 13 can be in direct contact with the controller 11 and cooperatively form a cavity with the controller 11, and the light source 12 is located in the cavity and is in direct contact with the controller 11. In one embodiment, the through hole 130 is a straight circular hole. A geometric center of the light source 12 is aligned with a geometric center of the diffractive optical component 14. The laser light generated by the light source 12 is directly irradiated onto the diffractive optical component 14 through the through hole 130, and the laser light irradiated onto the diffractive optical component 14 generates a diffractive optical image (such as a speckled image) which is projected onto the surface of the object 50 to be detected for feature calibration. That is, the laser light generated by the light source 12 does not pass through a lens on the optical path of the diffractive optical element 14. In other embodiments, the through hole 130 of the positioning bracket 13 may be other shapes such as a rectangle.

A grating (not shown) may be arranged on a side of the diffractive optical component 14 away from the positioning bracket 13 to enlarge a projection angle of the structured light emitting assembly 10.

In one embodiment, the diffractive optical component 14 is a rectangular structure, and a size of the diffractive optical component 14 is similar to a size of the positioning bracket 13, that is, a surface of the diffractive optical component 14 and the positioning bracket 13 can be coated with optical glue to adhere to each other.

Figure 3:
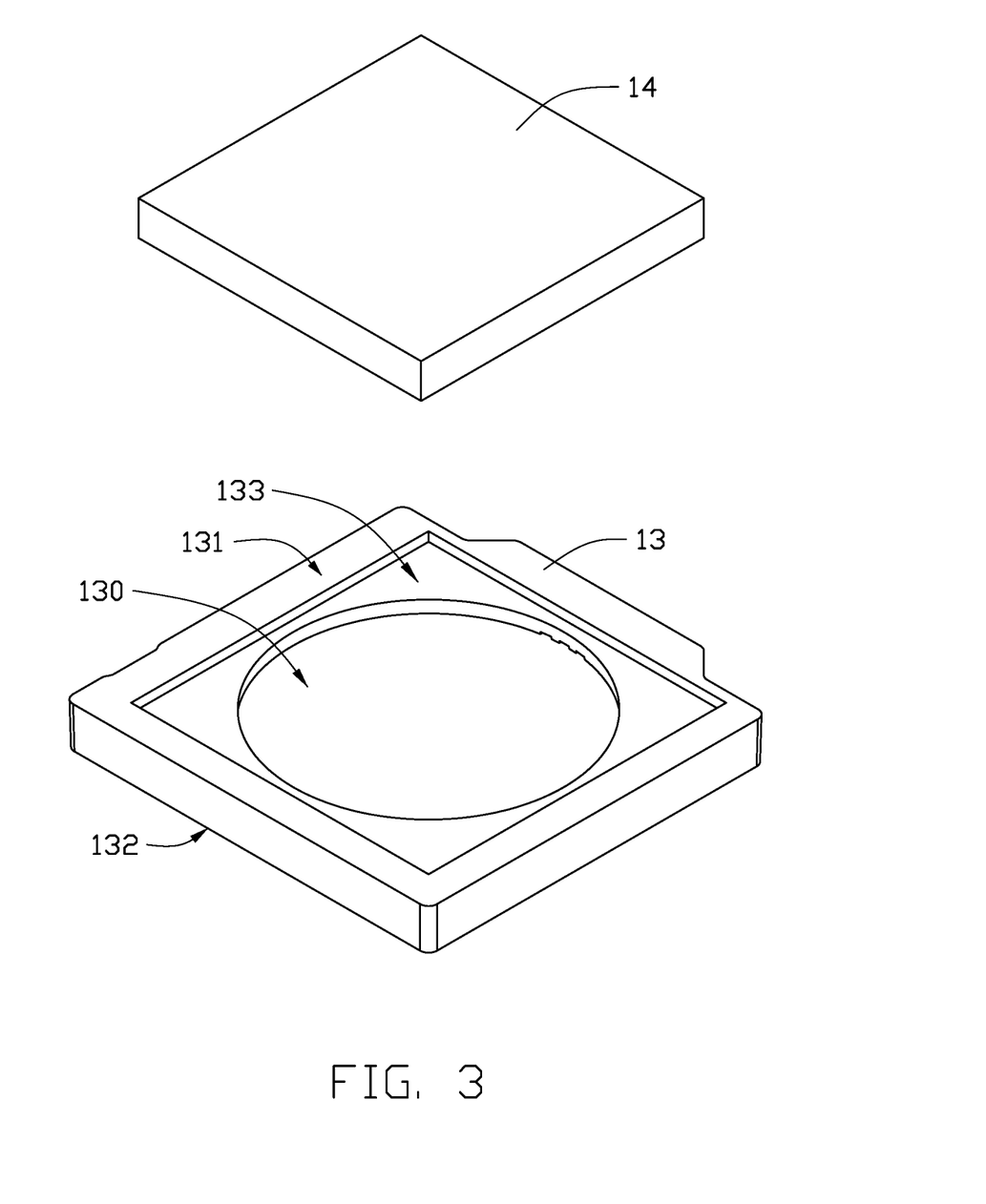
FIG. 3 is an isometric view of another embodiment of a positioning bracket.

Referring to FIG. 3, in one embodiment, the diffractive optical component 14 is a rectangular structure, but has a smaller size relative to the positioning bracket 13. The second surface 131 of the positioning bracket 13 defines a groove 133. The through hole 130 passes through a bottom of the groove 133, and the diffractive optical component 14 is embedded in the groove 133 to fix the diffractive optical component 14 in the positioning bracket 13.

By omitting a lens in the optical path between the light source 12 and the diffractive optical component 14 and arranging the positioning bracket 13 to fix the relative position between the controller 11 and the diffractive optical component 14, the structured light emitting assembly 10 can perform feature calibration on the object 50 to be detected, and an overall volume of the structured light emitting assembly 10 is reduced.

Figure 4:
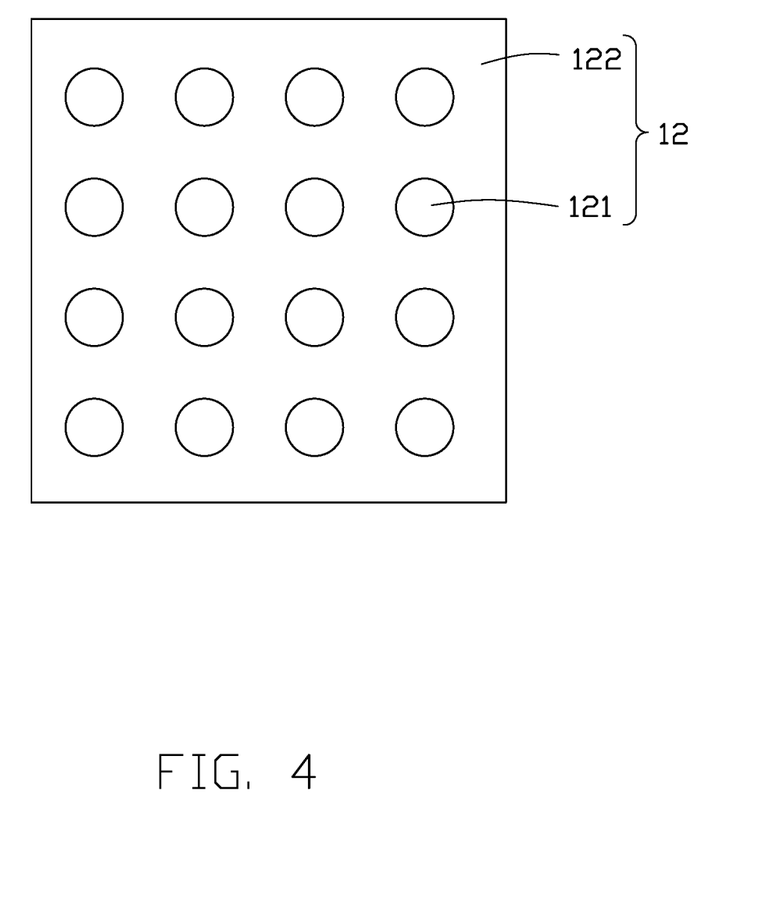
FIG. 4 is a schematic view of a light source shown in FIG. 2.

Referring to FIG. 4, the light source 12 includes a light source substrate 122 and a plurality of point source laser emitters 121 arranged on the light source substrate 122. The plurality of point source laser emitters 121 are vertical cavity surface emitting lasers (VCSE) arranged in a point laser generator array. A plurality of point source laser emitters 121 can be selectively turned on by the controller 11. Thus, only a portion of the point source laser emitters 121 is turned on. By selectively turning on the point source laser emitters 121 in the point laser generator array, different encoded structured light can be produced.

In one embodiment, the laser light generated by the light source 12 is infrared light having a wavelength of 800-900 nm to ensure that the structured light receiving assembly 20 receives the structured light reflected by the surface of the object 50 to be detected without interference by sunlight. Thus, restrictions on component selection in the structured light receiving assembly 20 are reduced to reduce manufacturing costs.

As shown in FIG. 4, in one embodiment, adjacent two rows of point source laser emitters 121 are aligned two by two, and adjacent two columns of point source laser emitters 121 are aligned two by two. In other embodiments, the point source laser emitters 121 may be arranged irregularly, and a number of point source laser emitters 121 may be added or subtracted according to specific needs.

Figure 5:
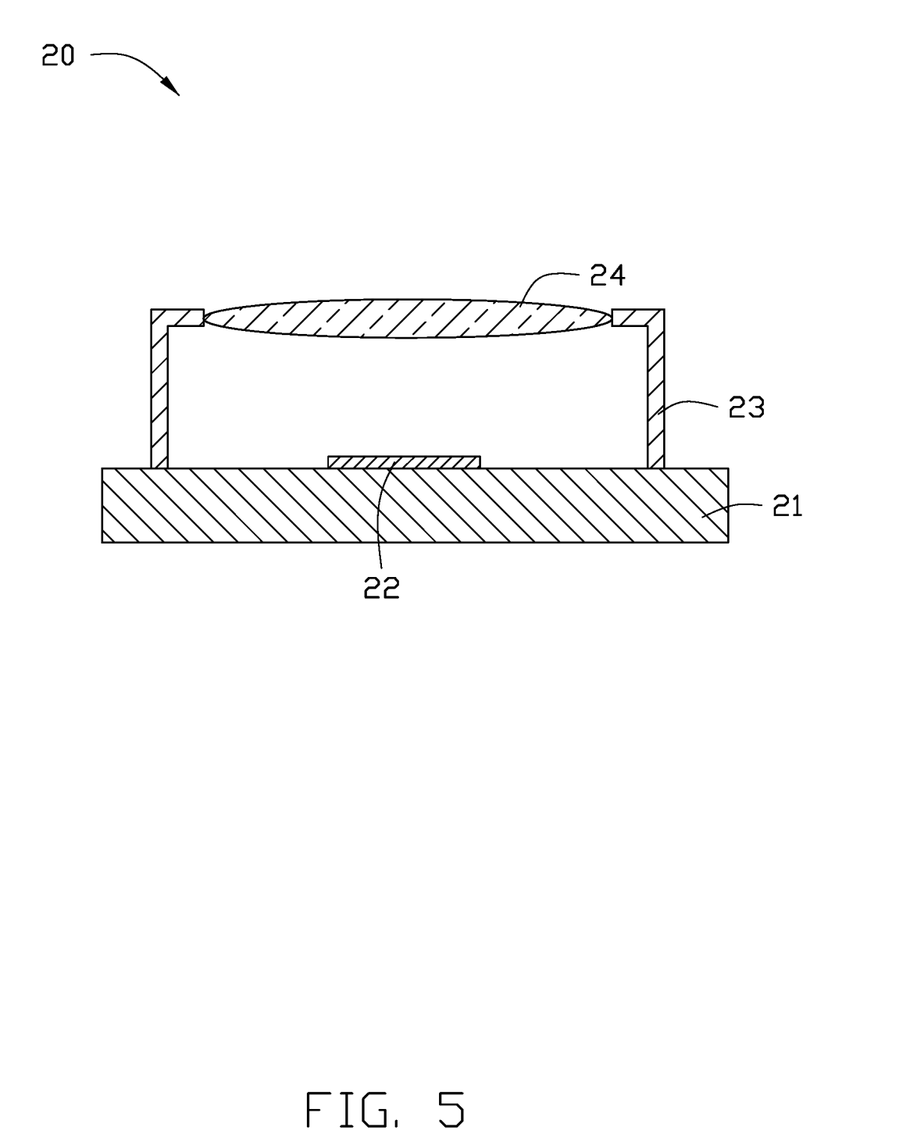
FIG. 5 is a cross-sectional view of a structured light receiving assembly of the structured light sensing assembly shown in FIG. 1.

Referring to FIG. 5, the structured light receiving assembly 20 includes a substrate 21 and a lens barrel 23 arranged on the substrate 21. The lens barrel 23 is sleeve-shaped and includes a hollow channel and a side wall surrounding the hollow channel. A lens 24 is arranged in the channel. A photosensitive component 22 is arranged on the substrate 21, and a geometric center of the photosensitive component 22 is aligned with a geometric center of the lens 24. The structured light is focused on the lens 24 after being reflected by the surface of the object 50 to be detected and projected onto the photosensitive component 22, and the photosensitive component 22 converts optical information of the received structured light into electrical information and transmits the electrical information to the processor 30.

The photosensitive component 22 responds only to light of a specific wavelength, such as infrared rays having a wavelength of 800 to 900 nm. Thus, the photosensitive component 22 in the structured light receiving assembly 20 only responds to the structured light reflected from the surface of the object 50 to be detected to convert the reflected structured light into electrical signals to ensure that the correct depth information of the object 50 to be detected is determined from the received structured light information.

The photosensitive component 22 may be a Complementary Metal Oxide Semiconductor (CMOS).

Figure 6:
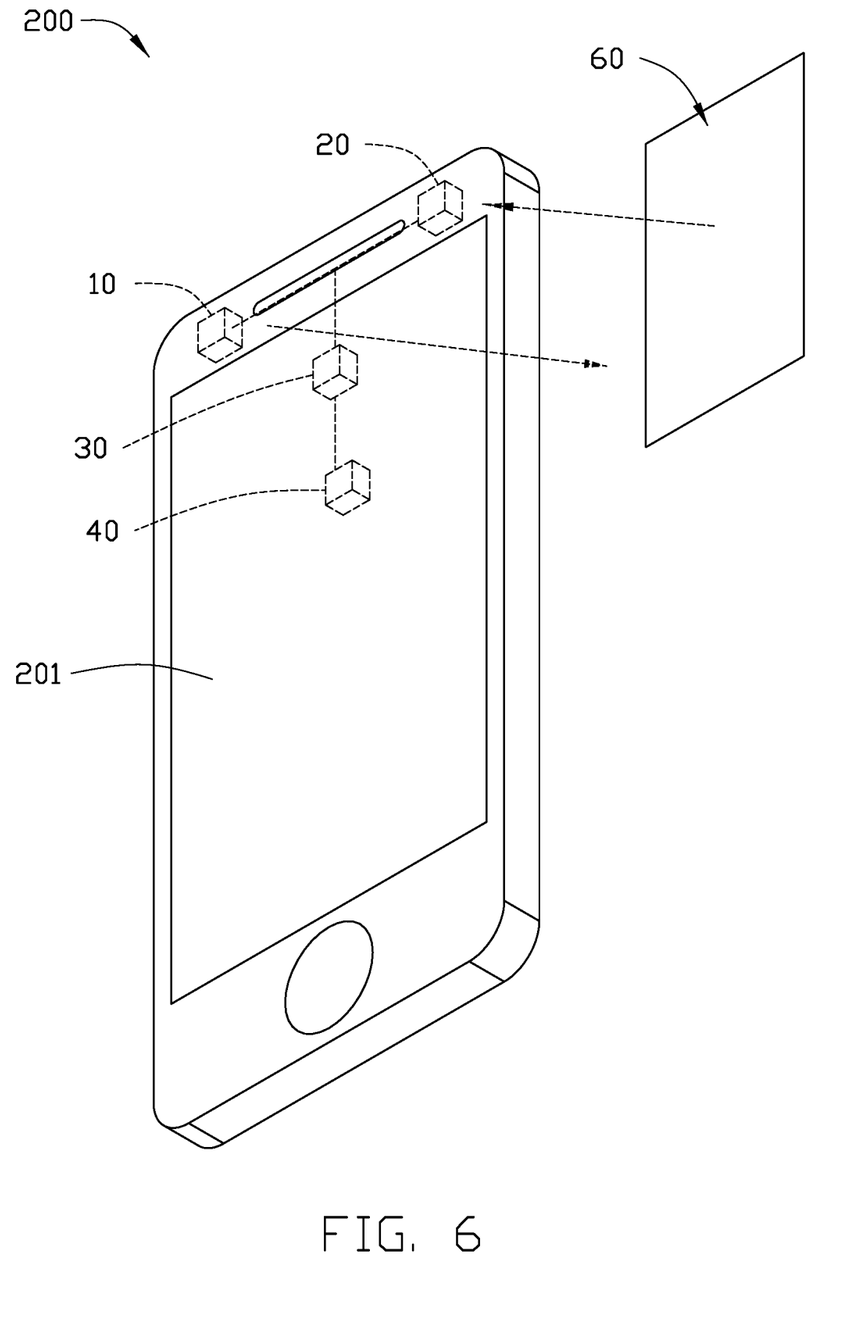
FIG. 6 is a schematic diagram of an electronic device including the structured light sensing assembly.

Referring to FIG. 6, an electronic device 200 includes a main body 201, a structured light emitting assembly 10, a structured light receiving assembly 20, a processor 30, and a memory 40. The structured light emitting assembly 10, the structured light receiving assembly 20, the processor 30, and the memory 40 are all mounted to the main body 201. The processor 30 and the memory 40 can be integrated into a control board of the main body 201.

The structured light emitting assembly 10 can project a structured light of a characteristic pattern to the surface of a spatial object 60. The spatial object 60 reflects the structured light, and the reflected structured light is received by the structured light receiving assembly 20. The structured light receiving assembly 20 is electrically coupled to the processor 30, and the processor 30 generates a corresponding image according to the reflected structured light. The processor 30 calculates the depth information of the spatial target 60 according to the distance information of the structured light emitting assembly 10 and the structured light receiving module assembly 20 stored in the memory 40, the focal length information of the structured light receiving assembly 20, the structured light information projected by the structured light emitting assembly 10, and the reflected structured light received by the structured light receiving assembly 20.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A structured light emitting assembly comprising:
a controller;
a light source electrically coupled to the controller and being adapted for generating laser light, wherein the controller is adapted for controlling the light source to generate the laser light;
a diffractive optical assembly arranged on an optical path of the laser light emitted by the light source for diffracting the laser light; and
a positioning bracket arranged between the diffractive optical assembly and the controller to fix a distance between the diffractive optical assembly and the controller;
wherein the positioning bracket comprises a first surface facing the light source and a second surface facing the diffractive optical assembly, defines a through hole penetrating the first surface and the second surface, and is in contact with the controller to form a cavity with the controller, the light source is located in the cavity;
wherein no lenses are arranged on an optical path of the laser light emitted by the light source; and the laser light emitted by the light source is directly irradiated onto the diffractive optical assembly through the through hole.

2. The structured light emitting assembly of claim 1, wherein the structured light emitting assembly is adapted for to project differently encoded structured light to an object to be detected.

3. The structured light emitting assembly of claim 1, wherein the diffractive optical assembly is arranged opposite to the light source to form a diffraction image of the laser light of the light source.

4. The structured light emitting assembly of claim 1, wherein:
the light source comprises a plurality of point light sources; and
each of the plurality of point light sources is a vertical cavity surface emitting laser.

5. A structured light sensing assembly comprising a structured light emitting assembly comprising:
a controller;
a light source electrically coupled to the controller and being adapted for generating laser light, wherein the controller is adapted for controlling the light source to generate the laser light;
a diffractive optical assembly arranged on an optical path of the laser light emitted by the light source for diffracting the laser light; and
a positioning bracket arranged between the diffractive optical assembly and the controller to fix a distance between the diffractive optical assembly and the controller;
wherein the positioning bracket comprises a first surface facing the light source and a second surface facing the diffractive optical assembly, defines a through hole penetrating the first surface and the second surface, and is in contact with the controller to form a cavity with the controller, the light source is located in the cavity;
wherein no lenses are arranged on an optical path of the laser light emitted by the light source; and the laser light emitted by the light source is directly irradiated onto the diffractive optical assembly through the through hole.

6. The structured light sensing assembly of claim 5 further comprising a structured light receiving assembly, wherein:
the structured light emitting assembly is adapted for projecting a structured light onto a surface of an object to be detected; and
the structured light receiving assembly receives the structured light reflected by the surface of the object to be detected.

7. The structured light sensing assembly of claim 6 further comprising a processor and a memory, wherein:
the processor calculates a depth of the object to be detected according to parameter information of the memory, information of the structured light projected by the structured light emitting assembly, and information of the structured light received by the structured light receiving assembly.

8. An electronic device for sensing a spatial object and comprising:
a main body; and
a structured light sensing assembly installed on the main body for sensing the spatial object, the structured light sensing assembly comprising a structured light emitting assembly comprising:
a controller;
a light source electrically coupled to the controller and being adapted for generating laser light, wherein the controller is adapted for controlling the light source to generate the laser light;
a diffractive optical assembly arranged on an optical path of the laser light emitted by the light source for diffracting the laser light; and
a positioning bracket arranged between the diffractive optical assembly and the controller to fix a distance between the diffractive optical assembly and the controller;
wherein the positioning bracket comprises a first surface facing the light source and a second surface facing the diffractive optical assembly, defines a through hole penetrating the first surface and the second surface, and is in contact with the controller to form a cavity with the controller, the light source is located in the cavity;
wherein no lenses are arranged on an optical path of the laser light emitted by the light source;
and the laser light emitted by the light source is directly irradiated onto the diffractive optical assembly through the through hole.

9. The electronic device of claim 8, wherein:
the structured light sensing assembly further comprises a structured light receiving assembly, wherein:
the structured light emitting assembly is adapted for projecting a structured light onto a surface of an object to be detected; and
the structured light receiving assembly receives the structured light reflected by the surface of the object to be detected.

10. The electronic device of claim 9, wherein:
the structured light sensing assembly further comprises a processor and a memory;
the processor calculates a depth of the object to be detected according to parameter information of the memory, information of the structured light projected by the structured light emitting assembly, and information of the structured light received by the structured light receiving assembly.

\* \* \* \* \*